(12) United States Patent
Liu et al.

(10) Patent No.: US 7,634,276 B2
(45) Date of Patent: Dec. 15, 2009

(54) METHOD OF INTELLIGENT CHANNEL ALLOCATION IN COMMUNICATION NETWORK SYSTEM

(75) Inventors: Chao-Yin Liu, Hsinchu (TW); Tsan-Kuang Su, Lujhou (TW)

(73) Assignee: Nuvoton Technology Corporation, Hsinchu (TW)

( * ) Notice: Subject to any disclaimer, the term of this patent is extended or adjusted under 35 U.S.C. 154(b) by 399 days.

(21) Appl. No.: 11/302,611

(22) Filed: Dec. 13, 2005

(65) Prior Publication Data

US 2007/0010255 A1    Jan. 11, 2007

(30) Foreign Application Priority Data

Jul. 11, 2005    (TW) .............................. 94123326 A

(51) Int. Cl.
*H04W 72/00* (2009.01)
(52) U.S. Cl. .................... 455/450; 455/422.1; 455/464; 455/509
(58) Field of Classification Search ................. 455/450, 455/452.1, 452.2, 435.2, 436, 438, 422.1, 455/464, 509

See application file for complete search history.

(56) References Cited

U.S. PATENT DOCUMENTS

| 6,466,793 | B1 | 10/2002 | Wallstedt et al. ............ 455/450 |
| 6,704,546 | B1* | 3/2004 | Lucidarme et al. ............ 455/62 |
| 2003/0058830 | A1 | 3/2003 | Schmidt ..................... 370/347 |
| 2005/0191964 | A1* | 9/2005 | Hundal ...................... 455/63.1 |

* cited by examiner

*Primary Examiner*—Ajit Patel
*Assistant Examiner*—Khai M Nguyen
(74) *Attorney, Agent, or Firm*—J.C. Patents

(57) ABSTRACT

An intelligent channel allocation method is used for detecting and avoiding a second wireless communication system taking advantage of the characteristic of a first wireless communication system in two different wireless communication system. The first wireless communication system features a narrower bandwidth, while the second wireless communication system has a non-fixed length of a frame for sending/receiving or a broader bandwidth. When these wireless communication system use a same radio frequency (RF) band, the carriers used by them are overlapped. To avoid the mutual interference, the first wireless communication system uses a background scanning mechanism to simultaneously detect the second wireless communication system and a presence range of the second wireless communication system is decided, followed by executing a handover scheme.

11 Claims, 5 Drawing Sheets

METHOD OF INTELLIGENT CHANNEL ALLOCATION IN COMMUNICATION NETWORK SYSTEM

CROSS-REFERENCE TO RELATED APPLICATION

This application claims the priority benefit of Taiwan application serial no. 94123326, filed on Jul. 11, 2005. All disclosure of the Taiwan application is incorporated herein by reference.

BACKGROUND OF THE INVENTION

1. Field of Invention

The present invention relates to a method of intelligent channel allocation, and particularly to a method of intelligent channel allocation aiming at TDMA (time division multiple access) and FDMA (frequency division multiplexing access) communication systems with mechanisms for detecting and avoiding interference source provided for advancing quality and efficiency of communication.

2. Description of the Related Art

In the ISM band (industrial, scientific and medical band), there are several co-existed wireless communication standards, such as the useful wireless local area network communication standard (802.11), the bluetooth wireless communication standard and so on. Each of the co-existed wireless communication standards adapts a different modulation mode and a different emitting power. Nevertheless, mutual interferences still occur between any different wireless communication standards. To overcome the problem, a so-called adaptive frequency hopping technique (AFH) was provided in the bluetooth wireless communication standard. However, such technique contains a method for avoiding interference sources only, it doesn't involve how to detect interference sources.

On the other hands, a TDMA (time division multiple access) communication system and a FDMA (frequency division multiplexing access) communication system provide a mechanism to detect and avoid interference sources so as to advance communication quality and efficiency. Due to a limited frequency resource in a common wireless network communication, it is adapted a digital technology only, if a frequency is required to be repeatedly used in the same area. The TDMA access technique refers to that using a timeslot (TS) concept a channel is shared by a plurality of sub-frames (TSs) for use. Namely, within a time duration, a frequency channel is allocated to a user for use, and once a TS ends the same frequency channel is allocated to another user for use. Similarly, all users are able to utilizes the frequency channel in a TS as to achieve access purpose. The FDMA access technique refers to that the bandwidth of a physical channel is divided into a plurality of narrower bandwidths, and each narrower bandwidth is taken as an independent logic channel for transmitting a signal in a different type.

SUMMARY OF THE INVENTION

An object of the present invention is to provide a method of intelligent channel allocation with mechanisms to detect interference sources and to avoid interference sources. According to the method of intelligent channel allocation provided by the present invention, the characteristic of the first wireless communication system is used to detect and avoid the second wireless communication system among the two different wireless communication systems.

In an embodiment, the first wireless communication system can have a narrower bandwidth than the second wireless communication system. While the second wireless communication system features a non-fixed frame length for emitting/receiving signals or a broader bandwidth. When the first wireless communication system and the second wireless communication system use the same RF band, the RF carrier used by the first wireless communication system and the RF carrier used by the second wireless communication system overlap. Therefore, the first wireless communication system is able to take advantage of a background scanning mechanism to simultaneously detect the second wireless communication system. Wherein, according to the received signal strength indicator (RSSI), the RF carrier number and the timeslot number through detection, the range of the existed second wireless communication system is decided, followed by taking a handover mode to avoid mutual interferences.

In an embodiment, the above-described first wireless communication system can be a TDMA communication system or a FDMA communication system, and the provided mechanisms to detect interference sources and avoid interference sources and so on are to advance communication quality and efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
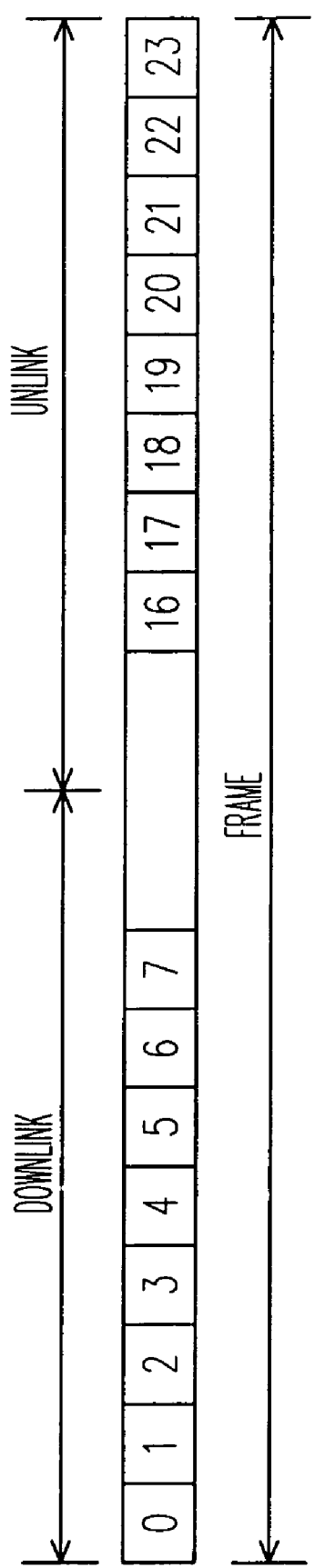
FIG. 1 is a diagram showing timeslot (TS) distribution in a frame of DECT system where 24 TSs are included and divided into downlink TSs in the left sector and uplink TSs in the right sector.

The present invention provides a method for detecting and avoiding a second wireless communication system by taking advantage of the characteristic of the first wireless communication system among these two different wireless communication systems. In an embodiment, the first wireless communication system can be a time division multiple access (TDMA) communication system or a frequency division multiplexing access (FDMA) communication system with a narrower bandwidth, for example, 1~2 MHz. While the features of the second wireless communication system are a non-fixed frame length for emitting/receiving signals or a broader bandwidth, for example, from 5 MHz to 20 MHz. When the first wireless communication system and the second wireless communication system use the same RF band, for example, 2.4 GHz of ISM wireless band, a RF carrier used by the first wireless communication system and a RF carrier used by the second wireless communication system overlap. Therefore, the first wireless communication system is able to take advantage of a background scanning mechanism to simultaneously detect the second wireless communication system. Wherein, according to the received signal strength indicator (RSSI), the RF carrier number and the timeslot number through detection, the range of the existed second wireless communication system is decided by the first wireless communication system using a background scanning mechanism, followed by taking a handover mode to avoid mutual interferences. The mechanisms of detecting interference sources and avoiding interference sources provided by the present invention is able to advance communication quality and efficiency.

To explain the mechanisms of detecting interference sources and avoiding interference sources provided by the present invention, the European digital enhanced cordless telecommunications (DECT) is taken as the typical example of a TDMA and FDMA communication system by the present invention hereinafter. For those skilled in the art, it is obvious the present invention is not limited to the above-mentioned DECT application. Any method for detecting and avoiding the second wireless communication system by taking advantage of the characteristic of the first wireless communication system among two different wireless communication systems belongs to the claimed scope of the present invention.

The European DECT is a low-power mobile telephone standard lunched in 1992 by Europe. DECT is superior in that through simply establishing base stations it enables to conduct telephony communication within a small range area without counting calling rate and it is suitable for internal communication within a small area, such as within a farm or a factory. A DECT system adapts a digital TDMA transmission manner and serves a high-density user region based on micro cell mode, where using the TDMA scheme, a frequency channel (or simplified, a channel) is divided into 12 voice channels, a time division duplex mode is further used and each voice channel has a coding rate of 32 kb/s.

The DECT system is used for an environment without coordination, where no synchronization is needed between different base stations and the wireless channels are assigned with so-called dynamically channel allocation (DCA) mode. Further, the DECT provides handsets with sleep mode for reducing electricity consumption. If a too large interference occurs during calling, it is also available to change the calling line from one timeslot to another, which is referred to as timeslot transfer. In fact the DECT system provides so-called seamless handoff, namely, there is no process gap for uplink or downlink during a handoff service.

In a DECT system, the basic time unit for delivering signals is frame, an approximate 10 mS (micro second) of time length. Each frame contains 24 timeslots (TSs) divided into downlink TSs in the left sector and uplink TSs in the right sector. The downlink TSs are used for a base station, namely a fixed part (FP) to deliver voice data to wireless handsets, namely portable parts (PPs), while the uplink TSs are used for wireless handsets to deliver voice data to the base station. Referring to FIG. 1, the left TSs 0~11 are downlink TSs, while the right TSs 12~23 are uplink ones.

Figure 2:
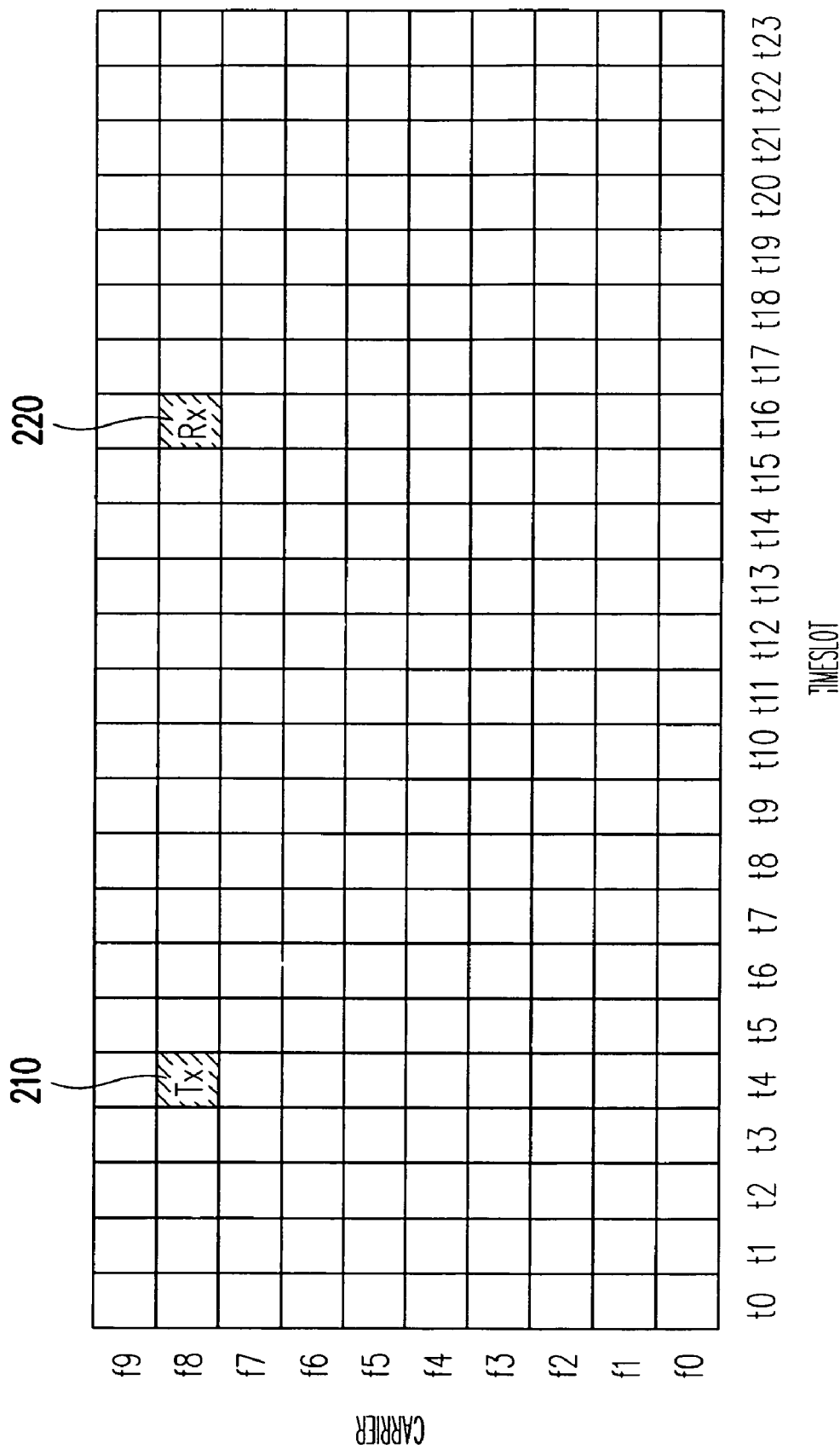
FIG. 2 is a diagram showing 10 bands in total are available as carriers in the DECT system.

As shown in FIG. 2, in the DECT system there are 10 bands in total are available as carriers for use. For example, when a connection line is built up between a base station and a handset, the $8^{th}$ carrier and the $4^{th}$ timeslot 210 are used for downlink, while the $8^{th}$ carrier and the $16^{th}$ timeslot 220 are used for uplink.

Figure 3:
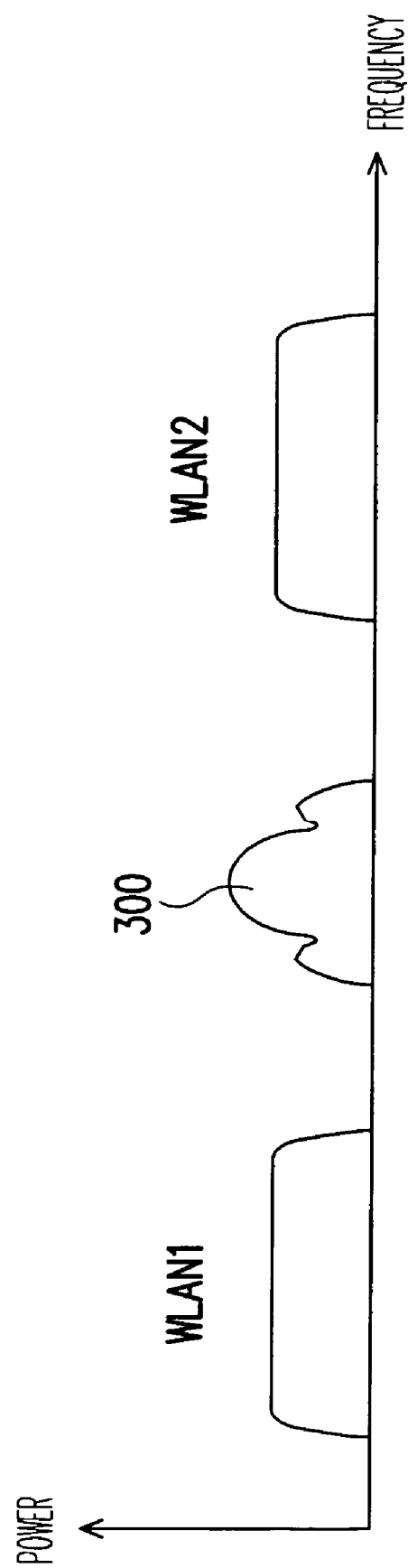
FIG. 3 is a diagram showing a relationship between the power distribution and the frequencies used by a DECT system and two WLANs (wireless local area networks) in an embodiment of the present invention.

In a practical environment using the DECT system, referring to FIG. 3, it is a diagram showing a relationship between the power distribution and the frequencies used by a DECT system and two WLANs (wireless local area networks) in an embodiment of the present invention. The environment using the DECT system 300 includes other two wireless local area networks (WLAN), namely WLAN1 and WLAN2 shown in FIG. 3. The DECT system 300 of the embodiment would automatically search any carrier within the ISM RF bands with a frequency unused by the DECT system 300. If a carrier with the unused frequency is discovered, it is counted as an interference and avoided by taking a FDMA scheme.

So-called WLAN characteristic in the present invention means the transmission time is longer than a timeslot (TS) in a regular TDMA system and the occupied bandwidth is also broader.

According to IEEE specifications, for a WLAN with the ISM band of 2.4 GHz, 13 channels in total are available. Since there is no electricity consumption issue in practice to worry about for a DECT base station, therefore the searching task in the embodiment is taken by the base station, so that any channel occupied by the WLAN is found out, followed by taking a FDMA scheme for avoiding a WLAN interference.

Figure 4:
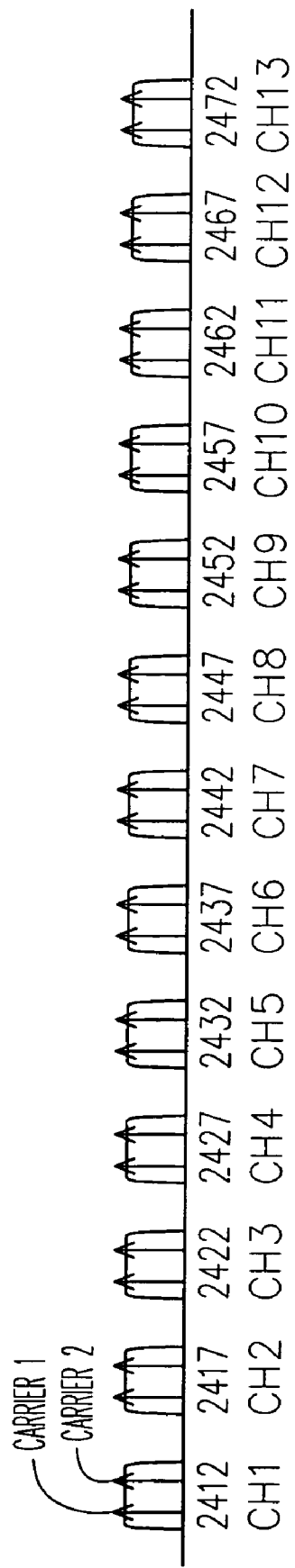
FIG. 4 is a diagram showing the channels and the carriers of a WLAN, wherein each channel is divided into 2 carriers, and there are 26 carriers in total across the 13 channels.

In an embodiment of the present invention, each channel of the WLAN is assigned to two carriers. Thus, for 13 channels there are 26 carriers in total. Referring to FIG. 4, it is a diagram showing the channels and the carriers of a WLAN, wherein each channel is divided into 2 carriers, and there are 26 carriers in total across from the first channel CH1 to the thirteenth channel CH13. In fact, the present invention doesn't limit the carrier number for each channel to two only, an increasing carrier number for each channel of the WLAN is allowed depending on the design requirement.

Figure 5:
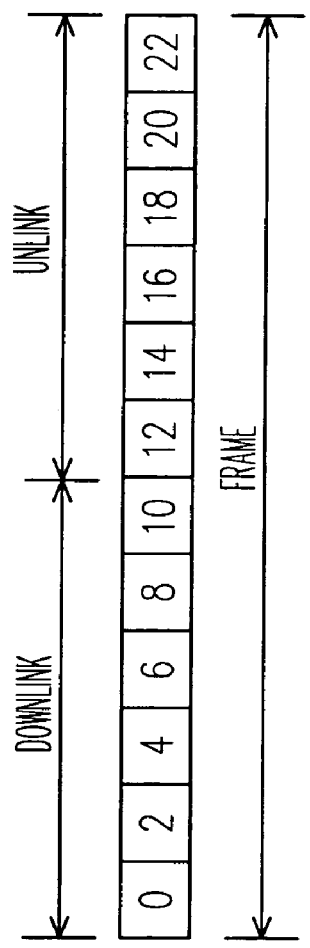
FIG. 5 is a diagram showing the downlink timeslots and uplink timeslots corresponding to a frame in a base station of an embodiment.

Continuing to FIG. 5, each frame in the base station has 24 TSs, including downlink TSs, i.e. 0, 2, 4, 6, 8 and 10 and uplink TSs, i.e. 12, 14, 16, 18, 20 and 22, shown in the figure. The base station takes a frame as time unit and in sequence searches 26 carriers, which mainly intends to detect whether a connection request from a handset occurs or not. If a carrier of a WLAN were delivering data, then, a radio signal strength indicator (RSSI) in considerable strength would be detected by all uplink TSs. In other words, with the DECT system of the embodiment as an example, a RSSI in considerable strength would be detected by all uplink TSs in 5 mS (micro second) of a continuous time. A conclusion that the carrier of a WLAN is delivering data herein can be inducted.

Figure 6:
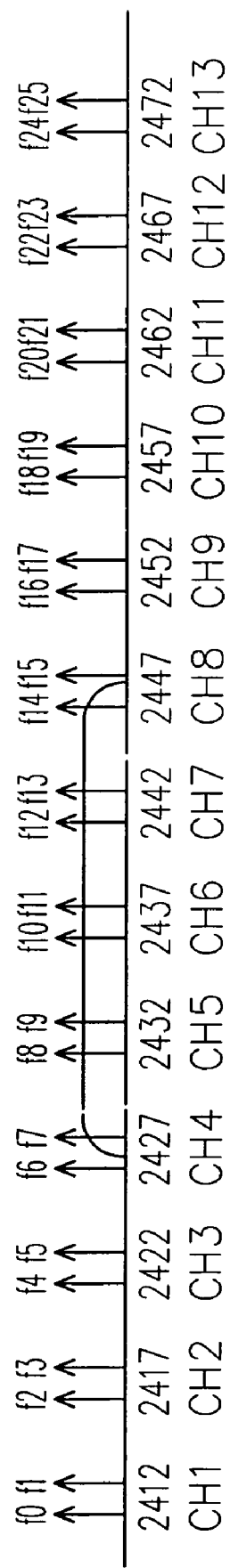
FIG. 6 is a diagram showing all the carriers marked as inhibitive ones corresponding to channel 6 in a DECT system of the embodiment, where an access point of a WLAN is transmitting data with channel 6.

Referring to FIG. 6, it is assumed that an access point (AP) of a WLAN is delivering data through channel 6. Since a channel of WLAN occupies a bandwidth of 24 MHz, which is equivalent to 8 carriers, therefore all the 8 carriers f7~f14 as shown in FIG. 6 would detect out a RSSI in considerable strength in 5 mS (micro second) of a continuous time. At the point, all the carriers are marked as inhibitive carriers and marked with a timestamp.

According to the above-described relationship between the channel and the carrier, all the channels in a preferred embodiment of the present invention are categorized into three sets. The first one is termed as free channel, where no inhibitive carrier is found out. The second one is termed as suspected channel, where one inhibitive carrier is found out. The third one is termed as polluted channel, where at least two inhibitive carrier are found out. Such channel categorizing can be further explained by FIG. 6. As shown in the figure, channel 3 is counted as a free channel, channel 4 is counted as a suspected channel and channel 5 is counted as a polluted channel.

According to the above-described channel categorizing scheme, any suspected channel or any polluted channel can be identified and avoided during delivering data. Such functions to detect an interference source and avoid an interference source are proved very valued to enhance the DECT system of the embodiment. In the practice however, the interference sources may be too many, which leads to a reduced carrier number, sometimes even to not-enough carrier number for use. To solve the problem, all the carriers in the suspected channels are allowed to be released for use in an embodiment, for example, the carrier band f7 and f14 in FIG. 6, because these carriers in the suspected channels normally fall in a sideband of an interference source and the sideband has a less interference.

After releasing the above-described channel, if the available carrier number is still too less, a further measure is taken that the polluted channels with the oldest timestamp are released, because the WLAN using the channels might be closed already.

A base station would inform the territorial handsets by a beacon which channel (no matter a suspected channel or a polluted channel) is not available. If a handset occasionally utilizes an inhibitive carrier to send out a connection request to the base station before receiving a beacon, the base station would refuse the connection request.

If a handset knows the utilized carrier is an inhibitive carrier once receiving a beacon notice from the base station, a beacon handover is immediately executed and the handset would transfer the utilized carrier to other available carrier.

If a base station found the present connection is utilizing an inhibitive carrier for delivering signals, the base station would immediately execute a connection handover to transfer the present inhibitive carrier to other available carrier.

The above-described channel categorizing scheme in association with the strategy to selectively handover a suspected channel or a polluted channel to other available any channel during delivering data are proved very valued to detect an interference source and avoid an interference source and accordingly to enhance the DECT system of the present invention.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An intelligent channel allocation method, suitable for a first wireless communication system and a second wireless communication system, wherein the first wireless communication system comprises a plutality of first channels, while the second wireless communication system comprises a plurality of second channels, and the bandwidths of the first channels are narrower than the bandwidths of the second channels, the method comprising:

detecting any RF signal over a predetermined strength presented on the first channels during a continuous preset time to decide whether any of the first channels is overlapped with a second channel; and marking the first channels overlapped with the second channels as the inbibitive channels and selectively forbidding the inhibitive channels to deliver data by the first wireless communication system.

2. The intelligent channel allocation method as recited in claim 1, wherein the first wireless communication system is a digital enhanced cordless telecommunications (DECT) system.

3. The intelligent channel allocation method as recited in claim 1, wherein the second wireless communication system is a wireless local area network (WLAN).

4. An intelligent channel allocation method as recited in claim 3, wherein each of the channels of the WLAN are categorized into one of a free channel, for no inhibitive carrier being found in the channel, a suspected channel, for a part of the inhibitive carriers being found in the channel, or a polluted channel, for all of the communication carriers corresponding to the channel being the inhibitive carriers.

5. The intelligent channel allocation method as recited in claim 4, wherein a DECT system avoids using the communication carriers corresponding to the suspected channel and the polluted channel.

6. The intelligent channel allocation method as recited in claim 5, wherein the DECT system selectively avoids using the communication carriers corresponding to the polluted channel and releases the inhibitive carriers corresponding to the suspected channel for use.

7. The intelligent channel allocation method as recited in claim 5, wherein the inhibitive carriers are also given a corresponding timestamp, and the DECT system selectively releases the communication carriers with the oldest timestamp corresponding to the polluted channel for use.

8. The intelligent channel allocation method as recited in claim 1 wherein the first wireless communication system uses a background scanning mechanism to simultaneously detect the second wireless communication system.

9. The intelligent channel allocation method as recited in claim 8, wherein the first wireless communication system uses received signal strength indicator (RSSI) of detected RF signals through the background scanning to decide a presence range of the second wireless communication system.

10. The intelligent channel allocation method as recited in claim 8, wherein the first wireless communication system uses the RF carrier number of the detected RF signals to decide a presence range of the second wireless communication system.

11. The intelligent channel allocation method as recited in claim 8, wherein the first wireless communication system uses a timeslot (TS) number of the detected RF signals to decide the presence range of the second wireless communication system.

* * * * *